(12) United States Patent
Patil

(10) Patent No.: US 6,625,460 B1
(45) Date of Patent: Sep. 23, 2003

(54) UNIFIED MESSAGING PROTOCOL USING SMS

(75) Inventor: Manoj Patil, Irving, TX (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/469,022

(22) Filed: Dec. 21, 1999

(51) Int. Cl.[7] .......................... H04Q 7/20; H04M 3/16; G08B 5/22
(52) U.S. Cl. ........................ 455/466; 455/412; 340/7.21
(58) Field of Search ................................ 455/466, 412; 340/7.48, 7.21, 7.23, 825.26, 825.27

(56) References Cited

U.S. PATENT DOCUMENTS

| | | | |
|---|---|---|---|
| 5,353,331 A | 10/1994 | Emery et al. ................... | 379/58 |
| 5,511,111 A | 4/1996 | Serbetcioglu et al. .......... | 379/67 |
| 5,546,444 A | 8/1996 | Roach, Jr. et al. ............. | 379/59 |
| 5,604,921 A | 2/1997 | Alanara ........................ | 455/45 |
| 5,742,905 A | 4/1998 | Pepe et al. .................... | 455/461 |
| 5,878,351 A | 3/1999 | Alanara ........................ | 455/466 |
| 5,884,159 A | 3/1999 | Thro et al. .................... | 455/412 |
| 5,920,826 A * | 7/1999 | Metso et al. ................... | 455/466 |
| 5,930,700 A | 7/1999 | Pepper et al. .................. | 455/414 |
| 5,966,663 A | 10/1999 | Gleason | |
| 5,974,300 A * | 10/1999 | LaPorta et al. ............... | 340/7.21 |
| 5,983,073 A | 11/1999 | Ditzik ......................... | 455/11.1 |
| 6,016,107 A * | 1/2000 | Kampe et al. ................. | 340/7.46 |
| 6,023,620 A * | 2/2000 | Hansson ....................... | 455/419 |
| 6,040,781 A * | 3/2000 | Murray ........................ | 340/7.39 |
| 6,044,275 A * | 3/2000 | Boltz et al. ................... | 455/412 |
| 6,091,961 A * | 7/2000 | Khalil ......................... | 455/466 |
| 6,119,014 A * | 9/2000 | Alperovich et al. .......... | 340/7.39 |
| 6,134,433 A | 10/2000 | Joong et al. ................... | 455/417 |
| 6,161,007 A | 12/2000 | McCutcheon et al. ........ | 455/412 |
| 6,175,741 B1 * | 1/2001 | Alperovich ................... | 455/458 |
| 6,201,974 B1 | 3/2001 | Lietsalmi et al. ............. | 455/466 |
| 6,289,223 B1 * | 9/2001 | Mukherjee et al. ........... | 455/466 |
| 2001/0041560 A1 * | 11/2001 | Tarkiainen et al. ........... | 455/466 |

FOREIGN PATENT DOCUMENTS

| | | |
|---|---|---|
| EP | 0936825 A | 8/1999 |
| GB | 2327571 A | 1/1999 |
| WO | WO-98/10608 A2 | 3/1998 |
| WO | WO 98 3422 A | 8/1998 |

OTHER PUBLICATIONS

"S–BCCH for IS–136", TR45.3.6/95.06.13/18, Digital Cellular Systems, Jun. 12–15, 1995 (Ericsson).
*Point–to–Point Teleservices,* Post–Ballot Version, IS–136.1 Rev A, Feb. 12, 1996.
*Over–the–Air Activation Teleservice (OATS),* PN–3474.1, Dec. 15, 1995.
*Short Message Terminal Implementation Guide,* Version 7.0, Apr. 20, 1995, pp. 1–20.
European Digital Cellular Telecommunications System (Phase 2), European Telecommunication Standard, ETS 300 625, Jan. 1995.
European Ditital Cellular Telecommunications System (Phase2 ),Unstructured Supplementary Service Data(USS-D)–Stage 3, (GSM 04.90), European Telecommunication Standard, Final Draft pr ETS 300 572, Nov. 1994.
*The Short Message Service–A New Service of Digital Mobile Communication,* Michael Hientz et al., USPTO 95–4077, Washington, D.C., 1995, translated from Fed. Repulic of Germany.

* cited by examiner

Primary Examiner—Nguyen T. Vo
Assistant Examiner—Sheila Smith
(74) Attorney, Agent, or Firm—Harrington & Smith, LLP

(57) ABSTRACT

A wireless station user is provided with a unified messaging protocol that enhances the currently available messaging capabilities of SMS. The user is provided with the capability to compose at least one distribution list for SMS messages. The user is also provided with the capability to send messages to at least one distribution list on a user determined, periodic basis. The user is further provided with the capability to send messages containing content obtained from external sources, and to send those messages periodically to at least one distribution list, where the content of the messages is automatically updated prior to sending the periodic message.

42 Claims, 7 Drawing Sheets

UNIFIED MESSAGING PROTOCOL USING SMS

FIELD OF THE INVENTION

This invention relates generally to radiotelephones and, in particular, to radiotelephones or wireless stations capable of exchanging messages.

BACKGROUND OF THE INVENTION

The Short Message Service (SMS) is a point to point, or point to multi-point service that enables users to exchange messages over a communications network. Receipt notification is part of the service, where the receiving station returns an acknowledgement, indicating that the message has been delivered. Text messages can originate from various sources, in various ways, including by dialing a toll free number to reach an operator who keys in the message and sends it, by using a software package to send a message directly from a user terminal. An SMS communication is not "real time", that is, messages are exchanged independently of each other, and as such, SMS communication does not require the establishment of a simultaneously contiguous end-to-end traffic path. A typical SMS system includes user terminals as the initiators or final destinations for messages, a Short Message Service Center (SMSC), which serves as a relay for messages among terminals through the network, and the network itself serving as the communications medium for the messages. Final destinations for messages are not limited to user terminals, and could include e-mail addresses and fax machines. The Short Message Transfer Protocol (SMTP), including various lower layer protocols, manages the transfer of messages among terminals.

A terminal configured for SMS provides the user with methods to compose, edit, send, receive, read, and delete messages. The connection of an optional keyboard or optional display to the terminal may facilitate the generation and editing of messages by the user. The message will typically contain the message contents, an identification of the final destination, and an identification of the desired SMSC. The message is sent through the communications network and is received and stored by the SMSC. The SMSC determines if the intended destination of the message is available to the network, and if so, the message is then sent to that destination. Whenever an SMS capable terminal is registered to a network, it is capable of exchanging SMS messages, even when the terminal is engaged in a voice or data call. If the intended destination is not available, or does not acknowledge delivery, the SMSC may then initiate any number of message handling routines including re-transmitting the message at periodic intervals or even discarding the message.

Reference may be had, by example, to TIA Interim Standard IS-136.1, Rev. A, Feb. 12, 1996, Section 7, for a description of one embodiment of various SMS message formats and protocols.

Another type of SMS is known as broadcast SMS (or also as S-BCCH), which is a point to multipoint message transmission (i.e. from a network operator to a plurality of wireless stations). Examples of broadcast SMS messages include road traffic reports, winning lottery numbers, and stock market quotations. Reference can be had, by example, to a publication entitled "S-BCCH for IS-136", TR45.3.6/95.06.13/18, Digital Cellular Systems, Jun. 12–15, 1995 (Ericsson), for a description of one type of S-BCCH.

A problem arises when a user desires to send a broadcast message to a specific set of recipients. For operator assisted messages, the operator must be notified of each recipient, while for locally generated messages, each recipient must be keyed in individually, as no provisions have been made for providing predefined distribution lists for messages.

Another problem arises when a user desires to send a message periodically. A user must recompose the message, or retrieve a saved copy of the message, and then resend it at the desired time, as no provisions have been made for a user determined periodic broadcast of a message to a distribution list defined by that user.

A further problem arises when a user desires to send a periodic message with updated content. Using stock market quotations as an example, a user may wish to send an updated quotation to a recipient on a periodic basis, for example, every hour. Under current practice, the user must obtain the information, compose the message, and then send the message, and this procedure must be repeated every hour.

SUMMARY OF THE INVENTION

The forgoing and other problems are overcome by methods and apparatus in accordance with embodiments disclosed herein.

A user-is provided with a unified messaging protocol that enhances the currently available messaging capabilities of SMS. The user is provided with the capability to compose SMS messages and with the capability to compose at least one distribution list for those messages. The user is also provided with the capability to send messages to recipients on at least one distribution list on a user determined, periodic basis. The user is further provided with the capability to send messages containing content obtained from external sources which may reside on various diverse networks including TCP/IP, X.25, FDDI, ATM, etc. The user is further provided with the capability to send those messages periodically to recipients on at least one distribution list, where the content of the messages is automatically updated prior to sending the periodic message. The recipients on the distribution lists may also be on diverse networks including those mentioned above.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

Figure 1:
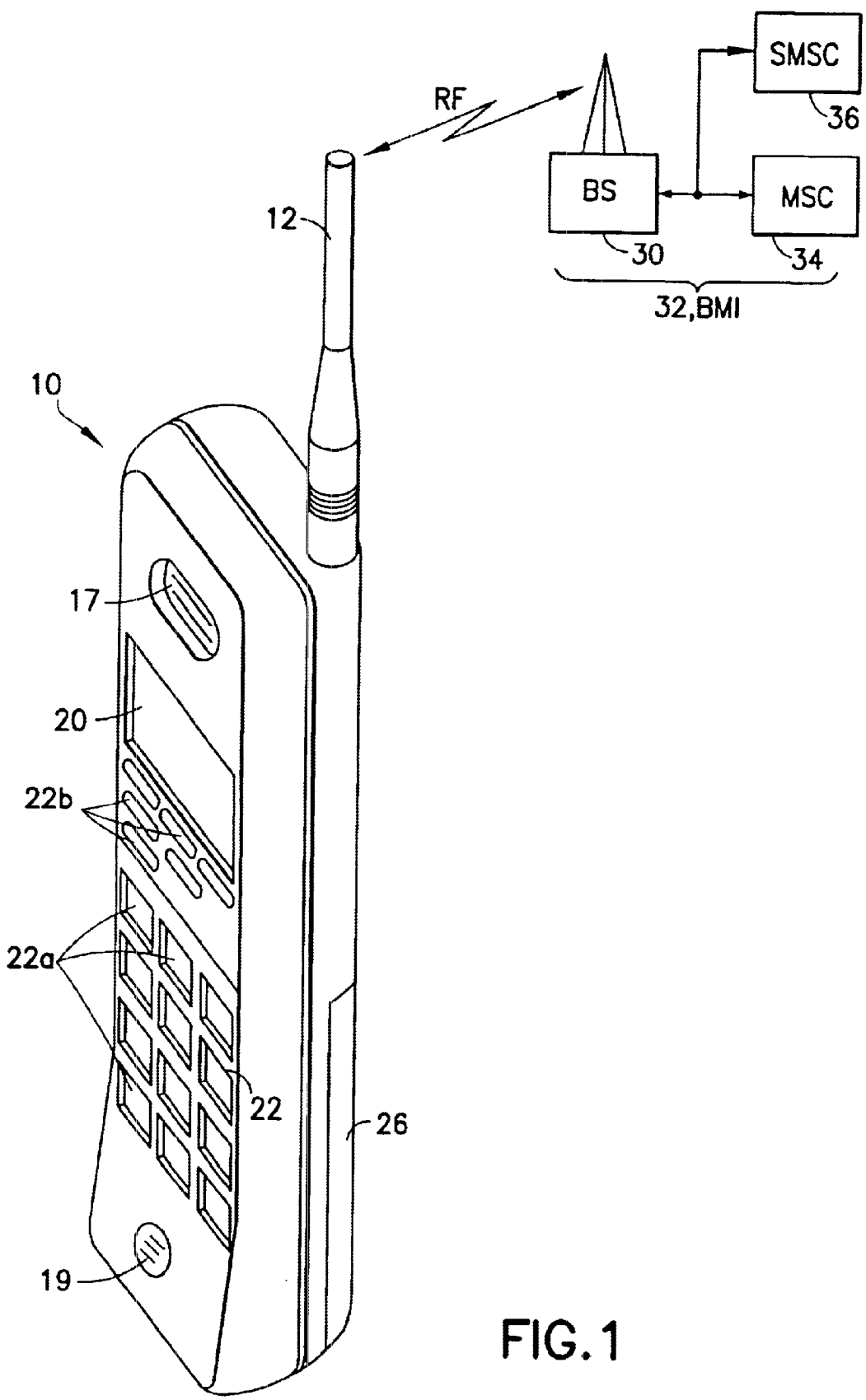
FIG. 1 is an elevational view of a wireless station and further illustrates a wireless communication system and a service provider to which the wireless station is bi-directionally coupled through wireless RF links.
Figure 2:
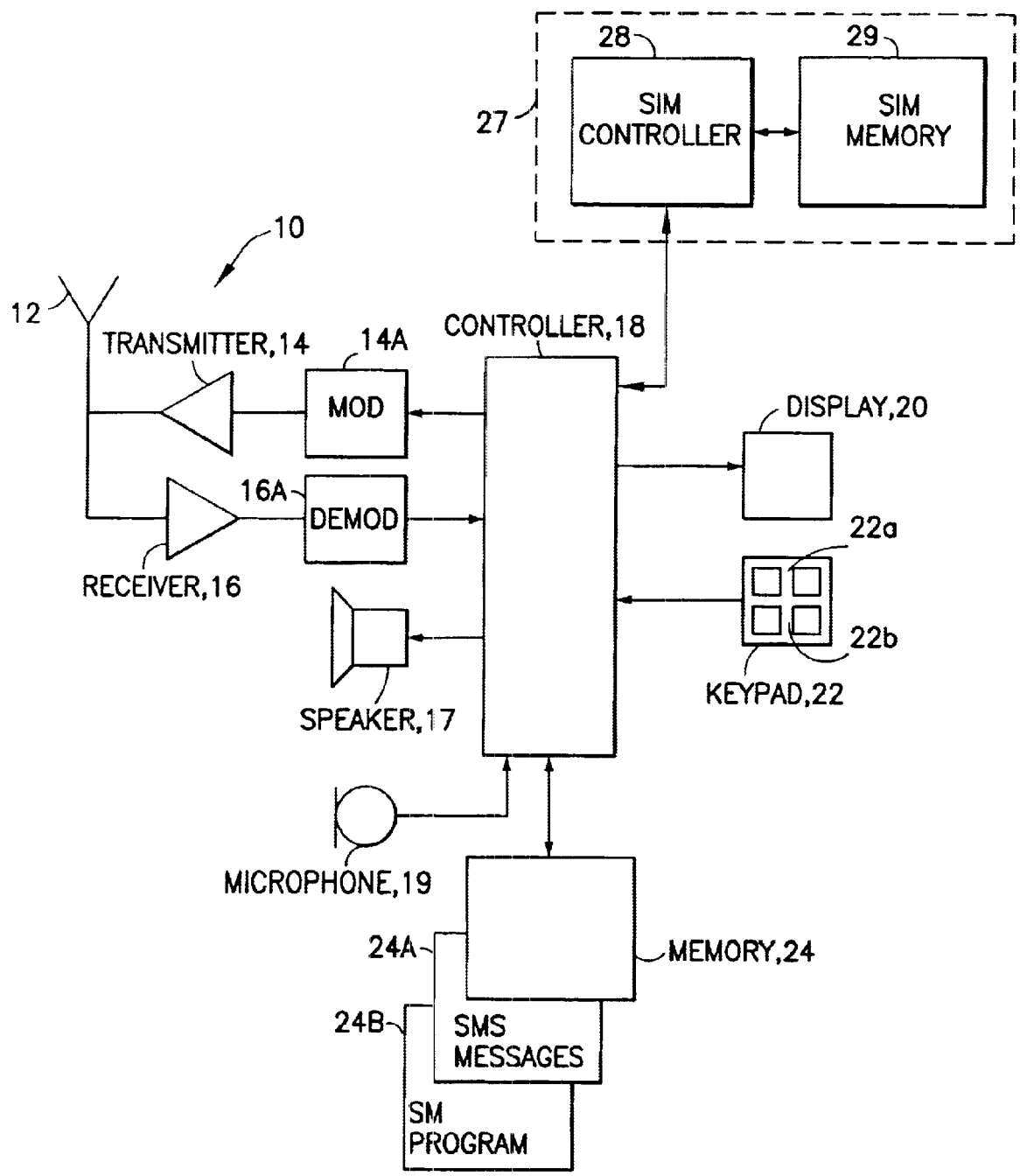
FIG. 2 is a block diagram of a wireless station that is suitable for practicing this invention.

Reference is made to FIGS. 1 and 2 for illustrating a user terminal 10, in this embodiment shown as a user terminal 10, that is suitable for practicing this invention. The user terminal 10 may be, but is not limited to, a cellular telephone or a personal communicator. It should be understood that the user terminal 10 can be a vehicle mounted, handheld, or stationary device.

The user terminal 10 includes an antenna 12 for transmitting signals to and for receiving signals from a base site or base station 30. The base station 30 can be a part of a cellular network comprising a Base Station/Mobile Switching Center/Interworking function (BMI) 32 that includes a mobile switching center (MSC) 34 and a Short Message Service Center (SMSC) 36. The MSC 34 provides a connection to landline trunks when the user terminal 10 is involved in a call.

The user terminal 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signaling information in accordance with the air interface standard of the applicable cellular system, and also user speech and/or user generated data. The particular type of air interface standard is not important to the operation of this invention, as the teachings of this invention apply generally to communications systems, including time division/multiple access (TDMA) systems and code division/multiple access (CDMA) systems. By example, the user terminal may be capable of operating with any number of other standards such as GSM. Some AMPS, narrow band AMPS (NAMPS), as well as TACS wireless stations may also benefit from the teaching of this invention, as should dual or higher mode stations (e.g. digital/analog or TDMA/CDMA/analog stations).

It is understood that the controller 18 also includes the circuitry required for implementing the audio (speech path) and logic functions of the wireless station. By example, the controller 18 may be comprised of a digital signal processor device, a microprocessor device, and various analog to digital converters, digital to analog converters, and other support circuits. The control and signal processing functions of the wireless station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the user terminal 10. These other keys 22b may include, by example, a SEND key, various menu scrolling and soft keys, and a PWR key.

The user terminal 10 also includes various memories, shown collectively as the memory 24, wherein are stored a plurality of constants and variables that are used by the controller 18 during the operation of the wireless station. For example, the memory 24 stores the values of wireless system parameters and the number assignment module (NAM). An operating program for controlling the operation of controller 18 is also stored in the memory 24 (typically in a ROM device). The operating program in the memory 24 includes routines to present messages and message-related functions to the user on the display 20, typically as various menu items. The memory 24 may also store data including point-to-point and Broadcast SMS messages 24A that are received from the SMSC 36 prior to the display of the messages to the user, as well as SMS messages composed by the user prior to transmission to the SMSC 36.

Figure 3:
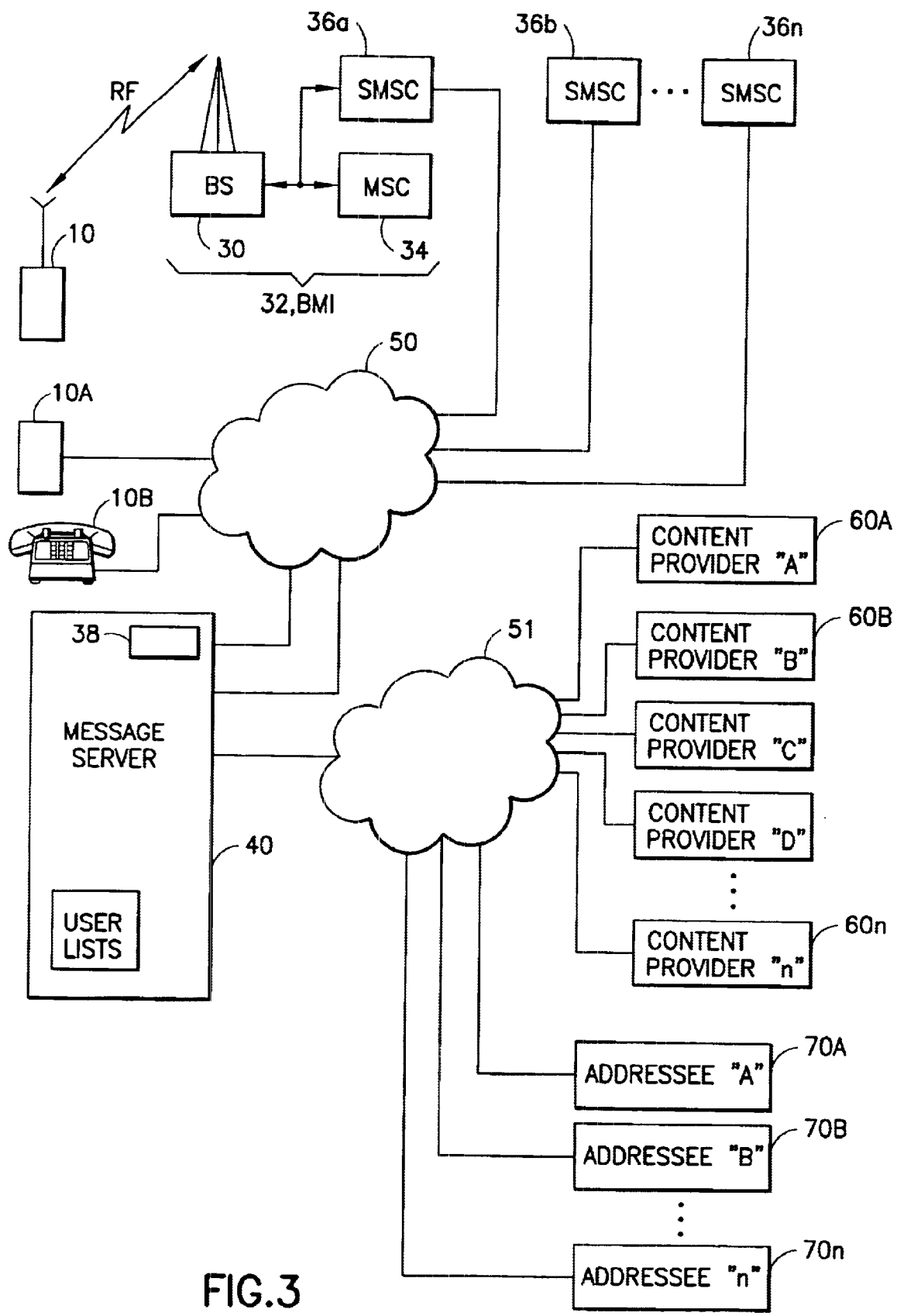
FIG. 3 is a block diagram of a wireless communications system utilizing the functions and embodiments disclosed herein.

FIG. 3 shows a preferred embodiment in accordance with the teachings disclosed herein. A user composes SMS messages and utilizes a user terminal 10 to convey those messages to the SMSC 36 via base station 30. The SMSC 36 communicates with a message server 40 through a communications link 50. The message server 40 preferably provides several functions. First, it receives user originated SMS messages specifying the composition of distribution lists for that particular user. Second, it gathers and stores information from various content providers, 60A, 60B, ... $60_n$, over link 51. Third, the server receives SMS messages from the user terminal 10 that cause it to assemble messages composed of information received from the content providers and to transmit messages to the addressees 70A ... $70_n$, on the distribution lists, again over the link 51. Link 51 may be any communications link capable of supporting communication between the message server 40 and the content providers 60, and between the message server 40 and the addressees 70. Link 51 may include the PSTN, the internet, a wireless network, a wired network, and may further include other types of networks including X.25, TCP/IP, ATM, etc. The various aspects of this embodiment are now described in further detail.

In the user terminal 10, the memory 24 further includes a memory 24B (FIG. 2) containing a short message program (SM program) which includes routines for implementing the method and apparatus disclosed herein, preferably by providing menus to the user. The menus allow a user to compose distribution lists for SMS messages, to cause messages to be sent to the distribution lists on a user determined, periodic basis, and to cause messages to be sent periodically where the contents of the messages are automatically updated each time the messages are sent.

In order to create a distribution list, a user selects the SM program in memory 24B (FIG. 2) by pressing the appropriate key(s) on the keypad 22. The SM program presents a menu of SM program options. These preferably include composing distribution lists for SMS messages, and sending messages to a specified distribution list or lists. The user then selects the menu option for composing distribution lists and is then further presented with a prompt to input data to define a name or identifier for the list. The user is then prompted to enter the addresses of the recipients that constitute the list. Upon completion, the SM program formats the message and sends it to the message server 40. The distribution list may be composed of a number of different address types, including telephone numbers, fax numbers, e-mail addresses, etc. It should be understood that the type of address is not limited to the examples given, but may be any type of address accessible by the message server 40 including addresses on the various networks described above.

In a further embodiment, the user terminal 10 may include a subscriber identification module (SIM) 27 which may include a SIM controller 28 and a SIM memory 29. In this case, the SM program, the SMS messages received, the user defined distribution lists and their contents, and information about the content providers may be stored in the SIM memory 29.

In order to send messages to a previously created distribution list, a user again enters the SM program and selects an option for sending messages. The user is prompted for the type of message to be sent. The message type may include user composed text messages or messages containing information from at least one of the content providers 60A, . . . 60$_n$, accessed by the message server 40. By example, the message type USER TEXT may include a message composed by the user for distribution to a particular distribution list. The user is then prompted for the text string to be sent. As a further example, the message type STOCK may include the current price of a particular stock, obtained from a content provider 60$_n$. The user may then be prompted for further parameters to be. included in the message, for example, NOK, to indicate that the current price of Nokia be included in the message. In both cases, after the message contents are specified, the user is then prompted for an identification of a distribution list. Upon completion, the SM program formats the message and sends it to the message server 40.

Other options related to sending messages preferably include having a message sent upon a triggering condition. Triggering conditions may include a certain time of day, a certain elapsed time, or a certain price being achieved for a particular commodity in the financial markets. Other triggering events may include a content provider receiving a news item about a particular weather condition, or a news item from a particular location. For example, a user may request that a text message be sent every morning at 7:00 am. As a further example, a user may request that information from a content provider 60A, . . . 60$_n$ be updated every hour, between 9:00 am and 4:00 pm, and sent to a distribution list. It is important to note that a triggering condition is not limited to the aforementioned examples, and that a triggering condition may include any event that the user terminal or the message server may be capable of recognizing.

In further embodiment messages may be sent to the user for approval, before being sent to the distribution list. For example, a user may request that information from a content provider 60A, . . . 60$_n$ be updated every 2 hours and sent to a distribution list. The user may request a further option where the message is first sent to the user for approval. Upon viewing the content, the user may decide to forgo sending the message for that particular period because, for example, the information may not have changed. At the next period, the message content is updated again and sent to the user for approval. This may continue until a specified time period has elapsed or the user changes the option.

Information about the content providers 60A, . . . 60$_n$ is preferably available to users from the message server 40. A user may request that the message server 40 send to the user a list of the content providers 60A, . . . 60$_n$, a list of the information available from the various content providers 60A, . . . 60$_n$, or that it send a description of any parameters that may be required for certain types of content as mentioned above for the users reference.

In a further embodiment, this information is stored in memory 24A and then utilized by the SM program for incorporation into the prompts displayed by the SM program. For example, when prompted to specify which information to send to a distribution list, the user may pick the information and any parameters for that information from a displayed list, rather than by typing it in through the keypad 22.

Another available option is an ability for the user to request previously created distribution lists. Preferably, a user is able to request that the message server 40 send to the user a list composed of the identifiers of previously created distribution lists, or the contents of a previously created list.

In a further embodiment, the list of identifiers, or the contents of a previously created list is stored in memory 24A and then utilized by the SM program for incorporation into the prompts displayed by the SM program, where for example, when prompted for a distribution list, a user selects one from the display, rather than entering one through the keypad 22. The information may also be used to edit the contents of distribution lists under control of the SM program.

In a further embodiment, the memory 24 in addition to the SM program and SMS messages may include storage for the user defined distribution lists and their contents, and information about the content providers and that information may be stored in the memory 24 instead of sending it to be stored in the message server 40.

Further, when operating the SM program, the user preferably has the ability to type in a text string without proceeding through all the prompts. For example, after invoking the SM program, at the appropriate prompt, the user may type FRIENDS: tom@tom.com; 123-123-4567. which the message server 40 recognizes as directing the creation of a distribution list called FRIENDS, containing an e-mail address tom@tom.com; and a telephone number, 123-123-4567. After sending the message that creates the distribution lists FRIENDS, the user may again invoke the SM program, and at the appropriate prompt, the user may type STOCK: NOK: FRIENDS, which the message server 40 recognizes as directing that the current stock price of Nokia be sent to the distribution list FRIENDS.

In a further embodiment, the user terminal 10 may be capable of composing and storing the distribution lists locally, composing SMS messages and sending those messages directly to identifiers on a distribution list that have an SMS address. The user terminal 10 further has the capability to distinguish between SMS and non-SMS addresses and may then route messages to non-SMS addresses to the message server 40 for distribution.

In a further embodiment, the user terminal 10 may be capable of obtaining content from the content providers 60$_n$ directly and incorporating the content into messages composed in the user terminal 10. The user terminal 10 may also be capable of recognizing a triggering condition, obtaining updated content from the content providers 60$_n$ upon the occurrence of the triggering condition, and sending messages with the updated content to predetermined recipients. The user terminal 10 may further be capable of sending messages with the updated content to identifiers on a distribution list.

In a further embodiment, the menus and prompts contained in the SM program, or the SM program itself, can be stored on the message server 40. At an appropriate time, the menus and prompts or the program can be downloaded to the user terminal 10, allowing new users access to the services and functions provided by the message server 40, and also allowing for upgrades to be downloaded automatically.

In general, the teaching of this invention applies to any user terminal that is capable of receiving messages from a system, that includes or is coupled to a device for conveying messages and a menu of functions to a user, and that furthermore includes or is coupled to a user input device, such as a keypad or a keyboard, with which a user can generate messages and also interact with the menu to select various functions. A computer, such as a PC, can be coupled to the user terminal 10 for composing and/or viewing SMS messages, as well as interacting with the SMS program. For example, the user terminal may be a personal computer 10A connected to communications link 50 and capable of communication with the message server 40 as shown in FIG. 3.

The user terminal may also be a telephone 10B, coupled through link 50 to a device 38 in the message server 40 for conveying a menu of functions and receiving input from the user through the telephone 10B.

The SMSC 36 may be conventional in construction and operation, and communicates with the message server 40 through a communications link 50. In a preferred embodiment, the SMSC 36 and the message server 40 communicate using a Transmission Control Protocol/Internet Protocol (TCP/IP). In this case, the communications link 50 supports TCP/IP, and the SMSC 36 utilizes TCP/IP communication hardware and software. A single message server 40 may service a single SMSC 36, or may service a number of SMSCs $36_b \ldots 36_n$, depending on the capacity of the message server 40.

In an alternate embodiment, the message server 40 may be incorporated into the SMSC 36.

As stated above, the message server 40 preferably receives SMS messages from users specifying the composition of distribution lists. It may also gather and store information from various content providers, 60A, 60B, ... $60_n$, and it may also receive SMS messages from the user terminal 10 that cause it to assemble outgoing messages composed of information received from the content providers 60 and to transmit those outgoing messages to the addressees on the distribution lists.

Figure 4:
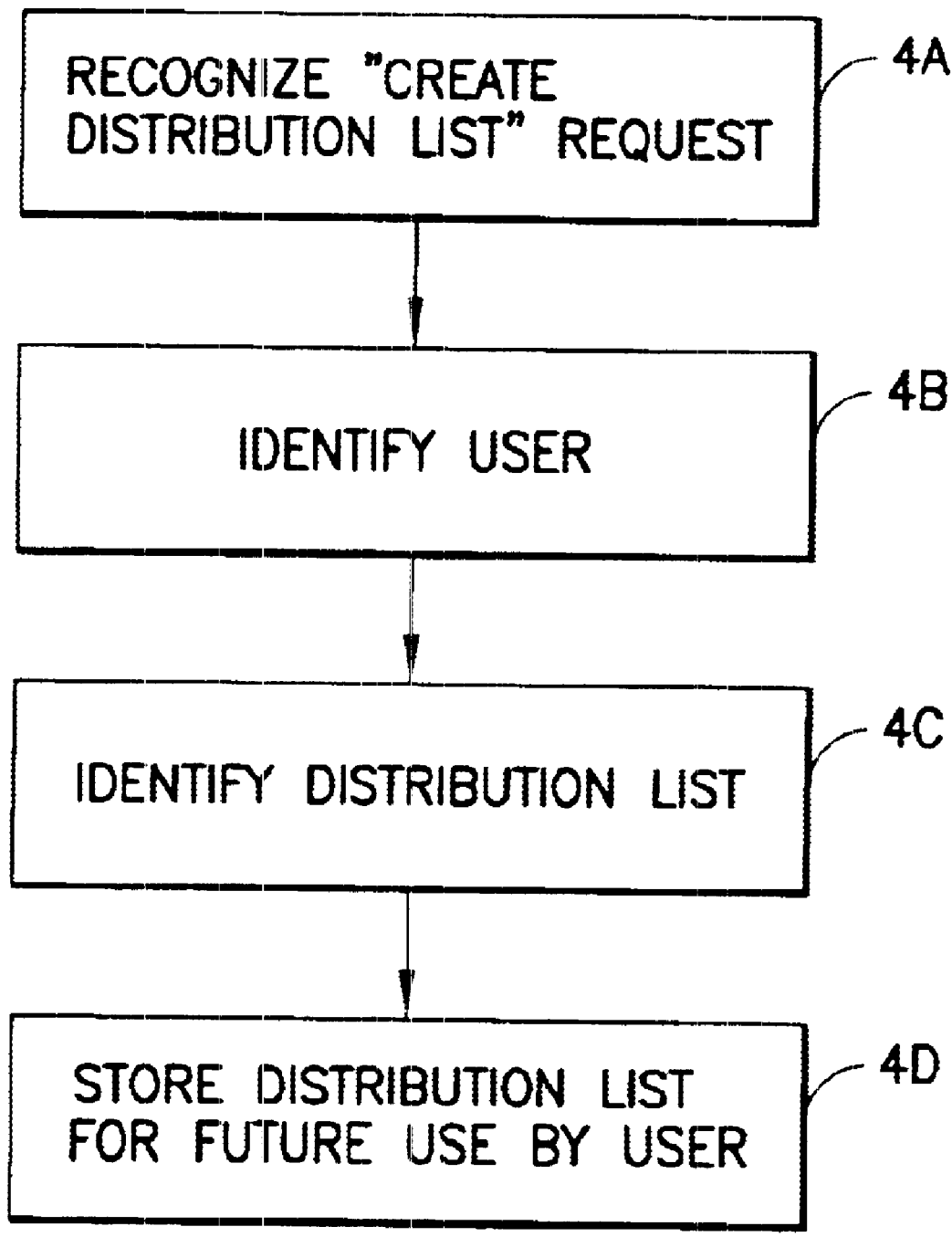
FIG. 4 shows a flowchart of the operation of the message server upon receipt of an incoming message directing the composition of a distribution list.

Referring to the flowchart of FIG. 4, upon receipt of an incoming message directing the composition of a distribution list, as described above, the message server 40 recognizes the request (Block 4A) as a request to create a distribution list. The message server 40 identifies the user (Block 4B) and also identifies the list with the specified list identifier (Block 4C). The message server then creates and stores the distribution list for future use by the user (Block 4D). As an example, a user (IDUSER) may compose a message containing a distribution list name and a distribution list (e.g. FRIENDS: tom@tom.com, peter@peter.com, 123-456-7890). The distribution list may contain any type of address capable of receiving SMS messages, for example, email addresses, fax machines, pagers, etc. The message destination is specified as the message server 40, e.g.: 800 MES SAGE, and the message is sent. The SMSC 36 receives the message and conveys it to the message server 40. The message server 40 recognizes that IDUSER has conveyed a distribution list called FRIENDS, composed of two email addresses and one phone number. The message server 40 then stores the distribution list identified as FRIENDS for future use by IDUSER. The message server 40 may have multiple users and each user may have multiple distribution lists. While each distribution list contains at least one addressee, a list may include multiple addressees.

Figure 5:
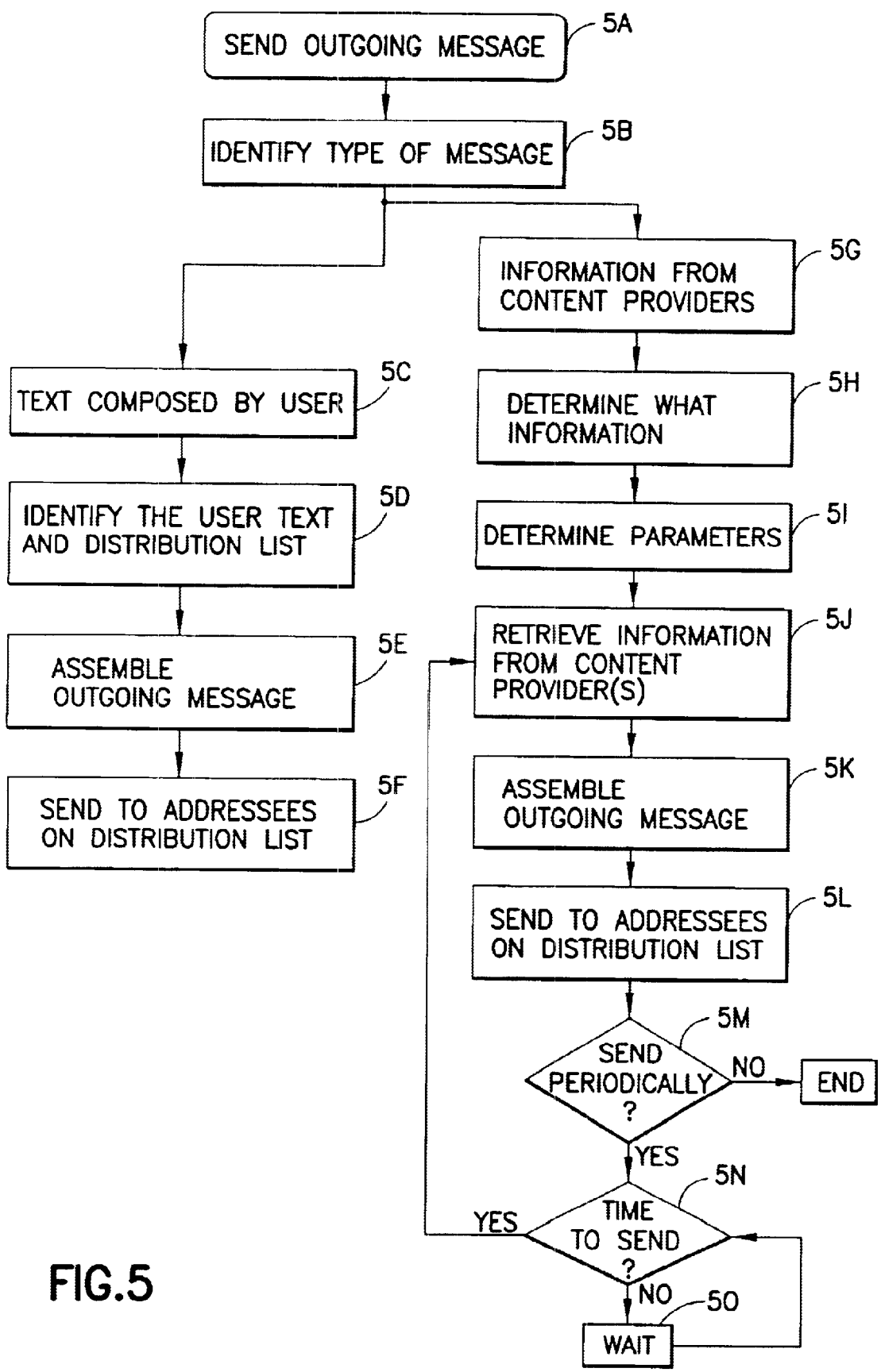
FIG. 5 shows a flowchart of the operation of the message server upon receipt of an incoming message directing that an outgoing message be sent.

Referring now to FIG. 5, upon receipt of an incoming message from IDUSER directing that an outgoing message be sent (Block 5A), the message server 40 parses the message to identify the type of message to be sent (Block 5B), and the distribution list for the message. In the case where the incoming message specifies that text composed by the user is to be sent (Block 5C), the message server 40 further parses the message to identify the user text and the distribution list (Block 5D). The message server 40 then assembles the outgoing message (Block SE) and sends it the addressees on the distribution list (e.g. FRIENDS) (Block 5F).

In the case where the incoming message specifies that information from at least one of the content providers 60A, ... $60_n$, is to be sent (Block 5G), the message server 40 further parses the message to determine what information is being requested (Block 5H). If necessary, the message server 40 still further parses the message to determine any parameters that may have been specified (Block 51). The message server 40 then retrieves the specified information from the identified content provider(s) 60 (Block 5J), and assembles the retrieved information into an outgoing message (Block 5K) and sends it to the addressees 70A ... $70_n$ on the distribution list (Block 5L).

For example, the user may compose an SMS message "STOCKS: ABC, NOK: FRIENDS". As above, the message destination is specified as the message server 40, e.g.: 800 SMS INFO, and the message is sent. The SMSC 36 receives the message and conveys it to the message server 40. The message server 40 recognizes that IDUSER is requesting that the current price of ABC and NOKIA stock be sent to the distribution list FRIENDS. The message server 40 then retrieves the prices, either from a periodic download or as a specific communications session with an information source as described below. When the information has been assembled, The message server 40 sends it to all addressees, including any email addresses (and possibly phone numbers) making up the distribution list FRIENDS.

The message server 40 is further responsive to portions of an incoming message specifying that an outgoing message be sent on a periodic basis (Blocks SM, 5N, 50). For example, a user may be able to request that a user text message be sent every morning at 7:00 am. As a further example, a user may request that information from a content provider 60A, ... $60_n$ be updated every hour, between 9:00 am and 4:00 pm, and sent to a distribution list. As a further example, a user may compose a command "STOCKS: EVERY HOUR: 9.00 AM: 4.00 PM: ABC, NOK: FRIENDS" in the form of an SMS message. Upon receipt, the message server 40 recognizes that IDUSER is requesting that the current price of ABC and NOKIA stock be sent to the distribution list FRIENDS, every hour between 9:00 am and 4:00 pm.

Figure 6A:
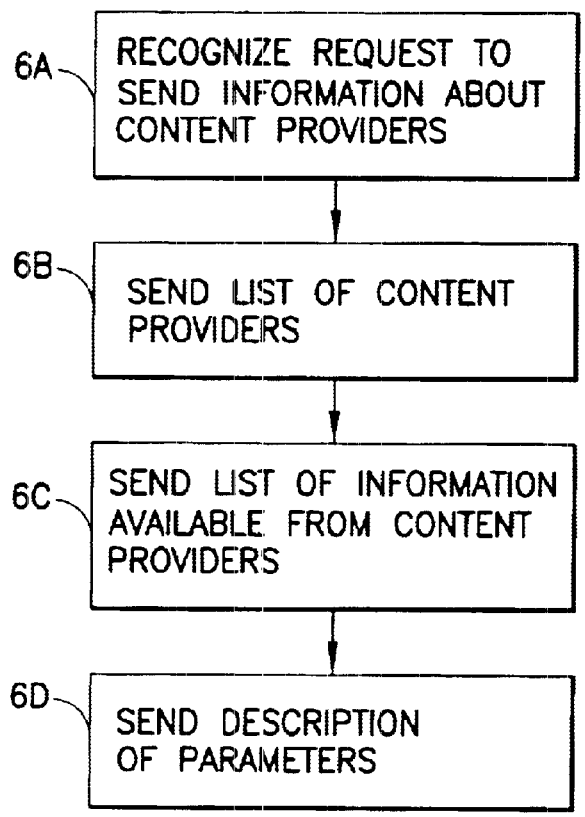
FIGS. 6A and 6B show flowcharts of the operation of the message server upon receipt of information requests about content providers and distribution lists, respectively.
Figure 6B:
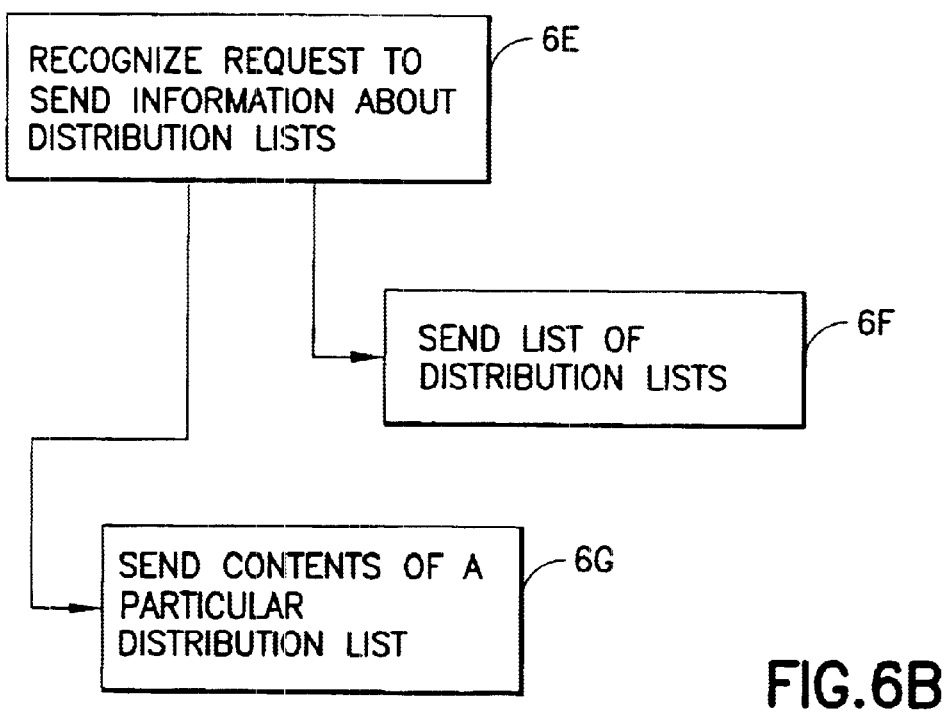

As shown in FIG. 6, the message server 40 is also responsive to incoming messages requesting information about the content providers 60A, ... $60_n$ (Block 6A). An incoming message may request that the message server 40 send to the user a list of the content providers 60A, ... $60_n$ (Block 6B), a list of the information available from the various content providers 60A, ... $60_n$ (Block 6C), or send a description of any parameters that may be required for certain types of content (Block 6D) as mentioned above, for the users reference.

The message server 40 is also responsive to incoming messages requesting information about distribution lists, also shown in FIG. 6 (Block 6E). An incoming message may request that the message server 40 send to the user a list of all user created distribution lists (Block 6F), or the contents of a distribution list (Block 6G), for the users reference.

As was mentioned previously, the message server 40 may store the menus and prompts contained in the SM program, or the SM program itself At an appropriate time, the menus and prompts or the program can be downloaded to a mobile station, allowing for access by new users, and upgrades to the services and functions provided by the message server 40.

The message server may also have the capability maintain public distribution lists which may be available to qualified users of the message server. Users may request that a message be sent to one of the public distribution lists in the same manner as a user defined distribution list. Users may further be able to incorporate a public distribution list into their own user defined distribution lists. Users may also have the capability to add themselves or to remove themselves from a public list.

Content providers $60A, \ldots 60_n$ may comprise a variety of conventional information sources, and the message server 40 may access them using an assortment of communications mediums. For example, the message server 40 may periodically poll a set of commercial content providers on the internet and download specific information. The message server 40 may dial up a news service every hour and download any new news content using the PSTN. It may also receive periodic radio transmissions indicating the correct time. The message server 40 may access content providers $60A, \ldots 60_n$. periodically, or may only access a content provider in response to a request from a user. For example, a user-may wish to send a message about the progress of a particular airline flight. If this information is not already being downloaded as part of the message server's normal activity, the message server 40 may initiate a specific communications session with a flight information provider and download the information as a result of the single request by the user.

Figure 7:
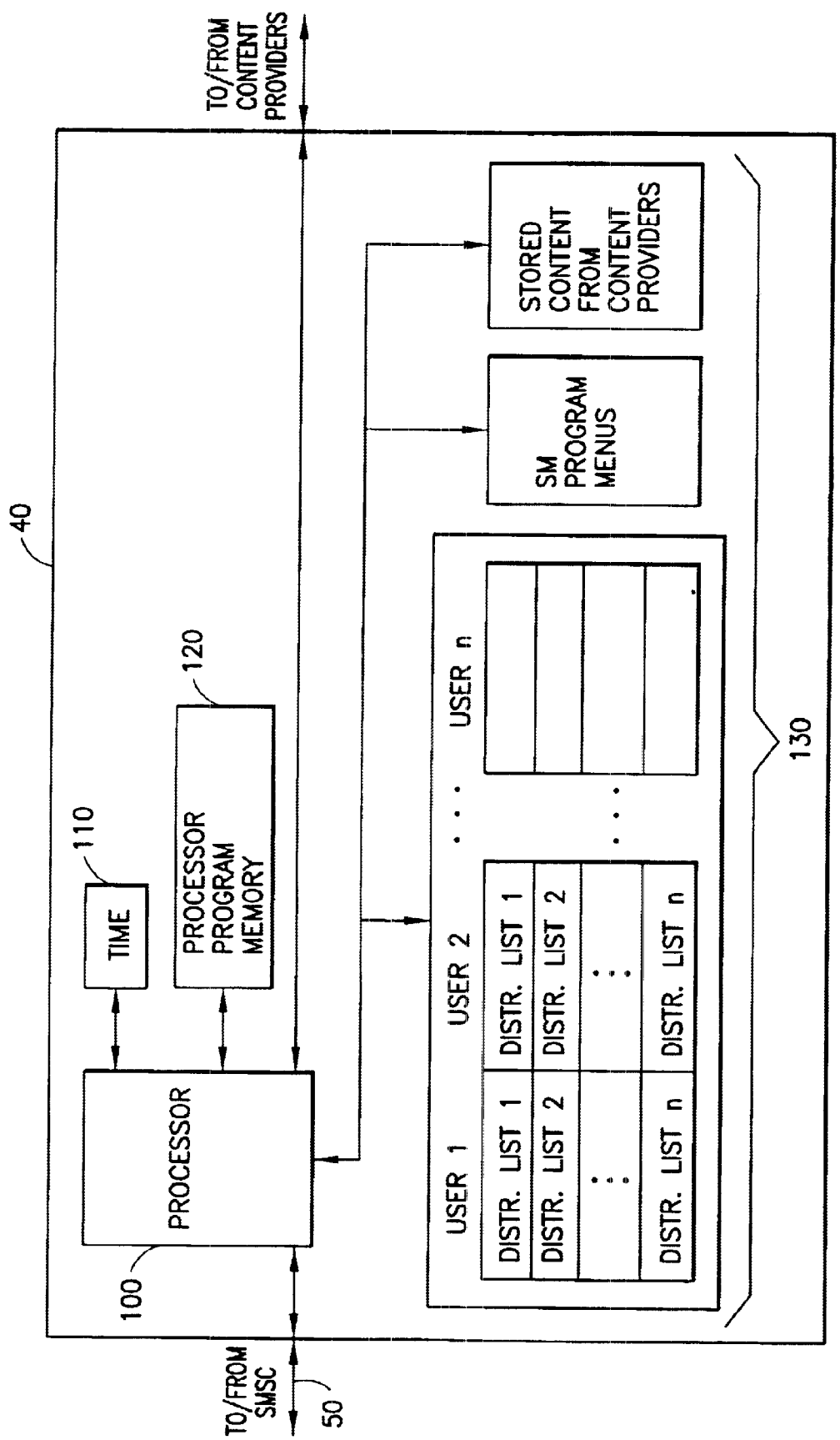
FIG. 7 is a block diagram of a portion of the wireless communication system, specifically a message server 40, that utilizes the functions and embodiments disclosed herein.

FIG. 7 shows a block diagram of the message server 40. The message server 40 comprises a processor 100, a time keeping facility 110, a processor program memory 120, and a message memory 130. The processor communicates with the SMSC 36 (FIG. 3) through link 50, and may also be in communication with the content providers 60 (FIG. 3) and the addressees 70 (FIG. 3) through link 51. The processor program memory 120 contains a control program for the processor 100 and includes software routines and algorithms for controlling the overall operation of the message server 40. The message memory 130 contains the distribution lists for all users (user 1, user 2, . . . user n), the SM program menus, and the stored content from the content providers 60. The time keeping facility 110 enables the processor 100 to send messages at the periodic interval specified by the originating user, as well as periodically update message content (e.g. stock prices).

It should be noted that the messages directed to the message server 40 are not limited to those stated above, and may encompass other messages related to composing and sending SMS messages to user defined distribution lists. It should also be noted that the messages directed to the message server 40 are not limited to the SMS message protocol. In a further embodiment, the user terminal 10, the SM program and the message server 40 support message protocols other than SMS. The user terminal 10 and the SM program may support all of the SM program functions mentioned above but may enable composition of messages in other formats to be sent to users on distribution lists that are capable of receiving those other formats. Correspondingly, the message server may support all the message server functions mentioned above but may also support those functions for messages in other formats.

Thus, while the invention has been particularly shown and described with respect to preferred embodiments thereof, it will be understood by those skilled in the art that changes in form and details may be made therein without departing from the scope and spirit of the invention.

What is claimed is:

1. A method for sending messages through a telecommunications system comprising a wireless network and at least one user terminal, said method comprising:

composing at least one user defined distribution list for messages;

storing said at least one user defined distribution list in a memory of said user terminal;

composing a short message service message; and, sending said message to recipients defined in said at least one user defined distribution list; where said user terminal distinguishes between those recipients found in said at least one user defined distribution list that have a short message service address and those recipients that have a non-short message service address, and routes a message for a non-short message service recipient to a message server for distribution.

2. The method of claim 1, wherein sending further comprises sending said message to said recipients upon the occurrence of a triggering condition.

3. The method of claim 1, wherein composing a message further comprises obtaining message content from an external source;

composing said message to comprise said external message content; and updating said content from said external source upon an occurrence of a trigger condition.

4. The method of claim 1, wherein composing a message further comprises:

obtaining message content from an external source;

composing said message to comprise said external message content;

updating said content from said external source upon an occurrence of a trigger condition;

sending a message with said updated content to a user; and, upon direction from said user, sending said message to said recipients defined in said at least one user defined distribution list or discarding said message.

5. The method of claim 1 further comprising, before composing at least one user defined distribution list, downloading a program that enables creation of user defined distribution lists to the user terminal from a network memory.

6. A user terminal comprising a wireless interface for sending messages through a telecommunications system, further comprising:

a processor; and a memory for storing a program for directing said processor for composing at least one user defined distribution list for messages;

storing said at least one user defined distribution list within said user terminal;

composing a short message service message; and, sending said message to recipients defined in said at least one user defined distribution list, where said user terminal processor distinguishes between those recipients found in said at least one user defined distribution list that have a short message service address and those recipients that have a non-short message service address, and routes a message for a non-short message service recipient to a message server for distribution.

7. The user terminal of claim 6, wherein said program operates to send said message upon the occurrence of a triggering condition.

8. The user terminal of claim 6, wherein said program further operates to perform the steps of:

obtaining message content from an external source;

updating said content from said external source upon the occurrence of a trigger condition; and sending a message with said updated contents to said recipients.

9. The user terminal of claim 6, wherein said program further operates to perform the steps of:

obtaining message content from an external source;

composing said message to comprise said external message content;

updating said content from said external source upon an occurrence of a trigger condition;

sending a message with said updated content to a user; and, upon direction from said user, sending said message to said recipients defined in said at least one user defined distribution list or discarding said message.

10. A message server for use in a telecommunications system that includes a service provider site and at least one user terminal, said message server comprising:

an interface for coupling through a wireless link to a user terminal, said user terminal comprising a memory for storing a short message program for creating at least one user defined distribution list, said interface further receiving a message comprising said at least one user defined distribution list from said user terminal;

a processor;

a processor program memory containing instructions coupled to said processor; and, a user memory coupled to said processor, said user memory for storing said at least one user defined distribution list received from said user terminal;

where said user terminal distinguishes between recipients found in said at least one user defined distribution list that have a short message address and those recipients that have a non-short message address, and routes a message for a non-short message recipient to said message server for distribution.

11. The message server of claim 10, wherein said processor program memory further comprises instructions directing said message server to receive and store said at least one user defined distribution list, receive short message service messages, and send said messages to recipients defined in said at least one user defined distribution list.

12. The message server of claim 10, wherein said processor operates to send said messages to recipients defined in said at least one user defined distribution list.

13. The message server of claim 10, wherein said processor operates to send said messages upon the occurrence of a triggering condition.

14. The message server of claim 10, further comprising a communications link coupling said message server to content providers whereby, content is conveyed from a content provider and incorporated into said messages, and upon an occurrence of a triggering condition, said content from said content supplier is updated and messages with said updated content are sent to recipients defined in said at least one user defined distribution list.

15. The message server of claim 10, where said user terminal comprises a memory for storing a short message program for use in creating at least one user defined distribution list in cooperation with a user of said user terminal, where said instructions stored in said processor program memory of said message server are operable directing said processor for downloading said short message program to said memory of said user terminal.

16. The message server of claim 10, wherein said service provider site comprises a base station, a base station controller and a short message service center.

17. The message server of claim 10, wherein said service provider site comprises a base station, a base station controller and a short message service center, and said message server is incorporated into said short message service center.

18. The message server of claim 10, wherein said telecommunications system comprises a plurality of service provider sites, each comprising at least one short message service center, and said message server is coupled to said short message service centers.

19. The message server of claim 10, where said instructions stored in said processor program memory of said message server are operable for directing said processor to download to said user terminal from said user memory a stored user defined distribution list.

20. A method for sending messages through a telecommunications system comprised of a wireless network and at least one user terminal, comprising:

composing at least one user defined distribution list for messages, said distribution list comprising at least one predetermined recipient;

storing said at least one user defined distribution list in a memory of said user terminal;

defining a content for a message and a supplier of said content;

updating said content from said content supplier upon an occurrence of a triggering condition; and, transmitting a message with the updated content to the least one predetermined recipient, where said user terminal distinguishes between message recipients found in said at least one user defined distribution list that have a short message service address and recipients that have a non-short message service address, and routes a message for a non-short message service recipient to a network message server for distribution.

21. The method of claim 20, wherein said step of transmitting said message further comprises:

upon an occurrence of a triggering condition, sending said message to a user; and, upon direction from said user, sending said message to said at least one predetermined recipient or discarding said message.

22. The method of claim 20, where composing occurs external to said user terminal, and further comprises transmitting the user defined distribution list for messages to said user terminal for storage in said memory.

23. The method of claim 20, further comprising, before composing at least one user defined distribution list, downloading a program that enables creation of the user defined distribution list to said user terminal.

24. A user terminal for sending messages through a telecommunications system comprising:

a wireless interface for coupling to a wireless network;

a processor; and a memory for storing a program for directing said processor to perform composing at least one user defined distribution list for messages, said distribution list comprising at least one predetermined recipient;

storing said at least one user defined distribution list in a memory of said user terminal;

defining a content for a message and a supplier of said content;

updating said content from said content supplier upon an occurrence of a triggering condition; and, transmitting a message, via said wireless interface, with the updated content to the at least one predetermined recipient;

where said user terminal distinguishes between message recipients found in said at least one user defined distribution list that have a short message service address and recipients that have a non-short message service address, and routes a message for a non-short message service recipient to a network message server for distribution.

25. The user terminal of claim 24, wherein said program further operates to perform the steps of:

transmitting said message with the updated content to a user; and, upon direction from said user, transmitting said message to said at least one predetermined recipient or discarding said message.

26. The user terminal of claim 24, further comprising transmitting the user defined distribution list for messages to said wireless network for storage.

27. The user terminal of claim 24, where at least a portion of said program that operates to compose said at least one user defined distribution list for messages is downloaded to said user terminal from said wireless network via said wireless interface.

28. A message server for use in a wireless telecommunications system that includes a service provider site and at least one user terminal, said message server comprising:

an interface for coupling to a user terminal, said user terminal comprising a memory for storing a program for creating messages;

a processor;

a processor program memory containing instructions coupled to said processor;

a user memory coupled to said processor, said user memory for storing messages received from said user terminal, said interface further receiving a message comprising at least one user defined message distribution list from said user terminal for storage into said user memory, said distribution list comprising an identification of at least one predetermined recipient; and, a communications link coupling said message server to at least one content provider whereby, content is conveyed from said at least one content provider and incorporated into said messages, and upon an occurrence of a triggering condition, said content from said content supplier is updated and said messages are sent to the at least one predetermined recipient;

where said user terminal distinguishes between message recipients found in said at least one user defined distribution list that have a short message service address and recipients that have a non-short message service address, and routes a message for a non-short message service recipient to said message server for distribution.

29. The message server of claim 28, wherein said user terminal further comprises a memory for storing a program for creating said at least one user defined message distribution list.

30. The message server of claim 28, wherein said processor program memory further comprises instructions directing said message server to receive and store said at least one user defined message distribution list, receive messages, and send said messages to recipients defined in said at least one user defined message distribution list.

31. The message server of claim 28, where said instructions stored in said processor program memory of said message server are operable for directing said processor to download to said user terminal from said user memory a stored user defined message distribution list.

32. The message server of claim 28, where a program for use in composing said user defined message distribution list is downloaded to said user terminal from said wireless network.

33. The message server of claim 28, wherein said telecommunications system comprises a plurality of service provider sites, and said message server is coupled to said plurality of service provider sites.

34. A wireless station for use in a wireless telecommunications system that includes a service provider site, said wireless station comprising:

a memory for storing a short message program for enabling a user, in cooperation with a user interface, to compose at least one user defined distribution list; and, a wireless transceiver for coupling said wireless station to a message server through said service provider site, said message server receiving messages, including a message comprised of the at least one user defined distribution list, and cooperating with said wireless station for sending said received messages to recipients defined in said at least one user defined distribution lists where said wireless station distinguishes between those recipients found in said at least one user defined distribution list that have an SMS address and those recipients that have a non-SMS address, and routes a message for a non-SMS recipient to said message server for distribution.

35. The wireless station of claim 34, wherein said service provider site receives said at least one user defined distribution list from said wireless station, stores said received at least one user defined distribution list, and transmits said stored at least one user defined distribution list to said wireless station upon request.

36. The wireless station of claim 34, wherein said messages are sent on a periodic basis, specified by a user of said wireless station.

37. The wireless station of claim 34, further comprising a communications link coupling to content providers whereby, upon request, information is conveyed from a content provider and incorporated into said messages.

38. The wireless station of claim 34, further comprising circuitry for automatically updating a content of said message from a content source.

39. The wireless station of claim 34, where said wireless station comprises a SIM for storing said at least one user defined distribution list.

40. The wireless station of claim 34, where said wireless station comprises a wireless telephone that comprises both said user interface and said wireless transceiver.

41. The wireless station of claim 34, where said wireless station comprises a wireless telephone that comprises said wireless transceiver, and where said user interface comprises a part of a computer that is coupled to said wireless telephone.

42. The wireless station of claim 34, where said wireless station comprises a computer that comprises said user interface, said computer being coupled to said service provider site through said wireless transceiver.

* * * * *